Feb. 10, 1925.
R. JARDINE
1,525,547
MOTOR VALVE AND METHOD FOR MAKING THE SAME
Original Filed Dec. 20, 1920    3 Sheets-Sheet 2
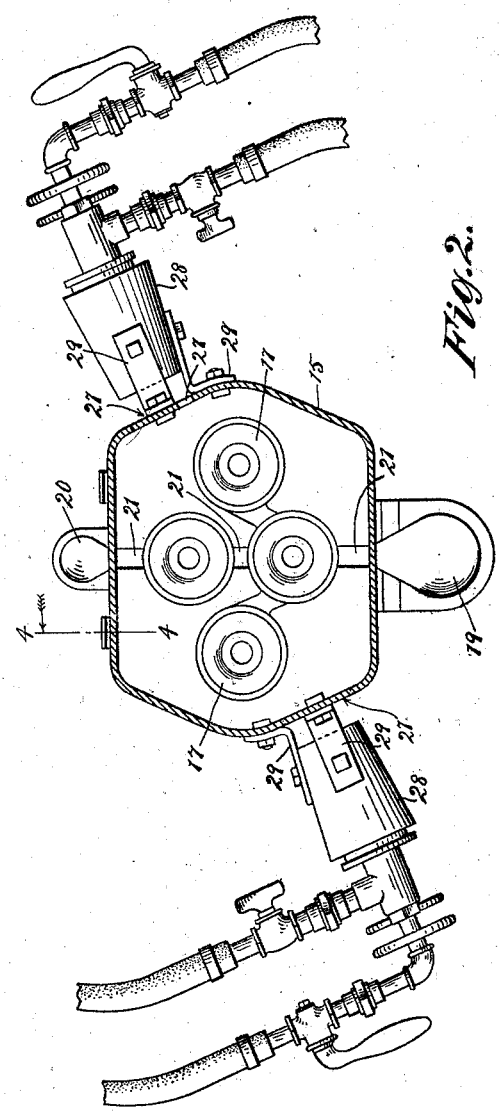
Inventor:
Robert Jardine
By Gillson & Gillson
Attys.

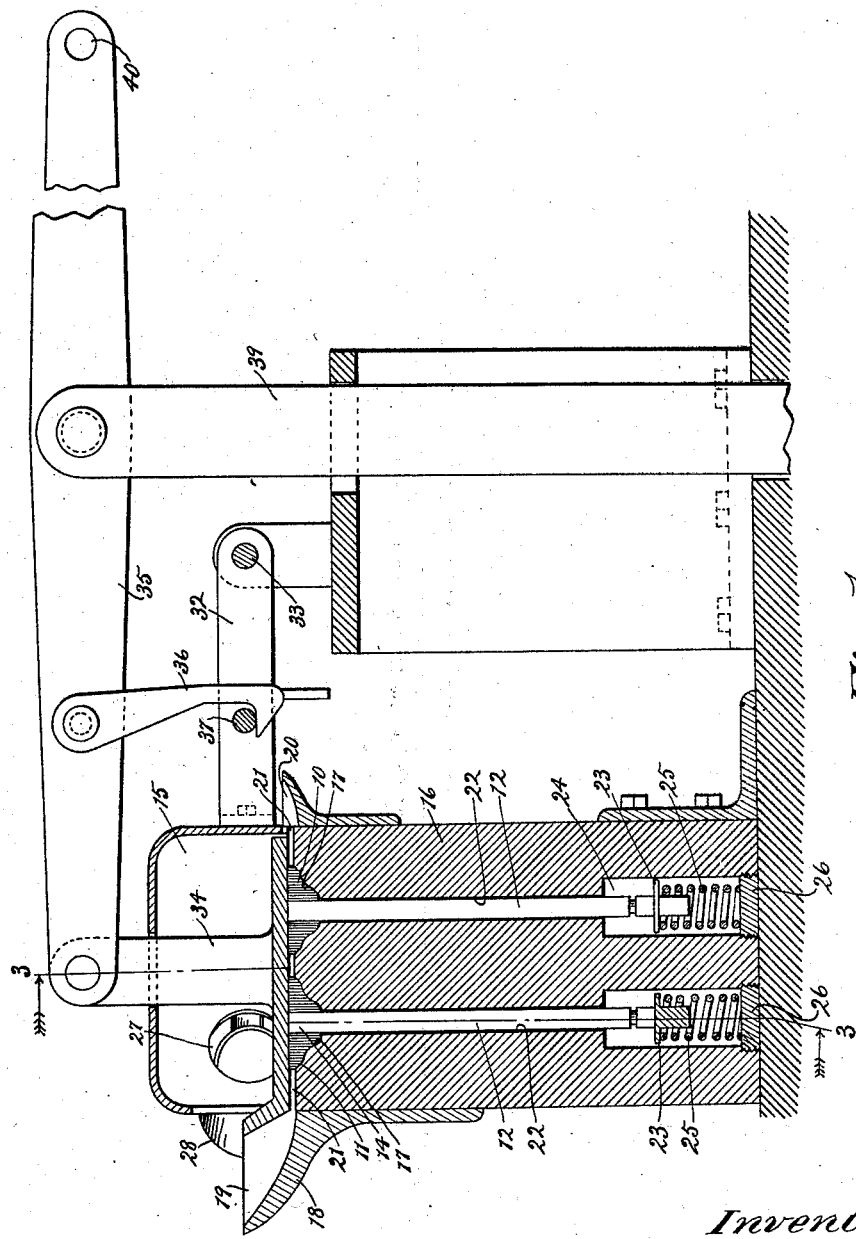

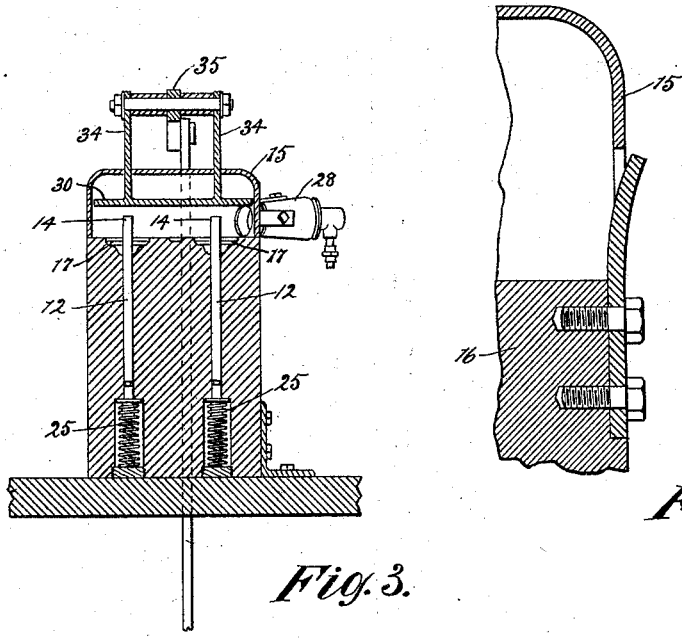
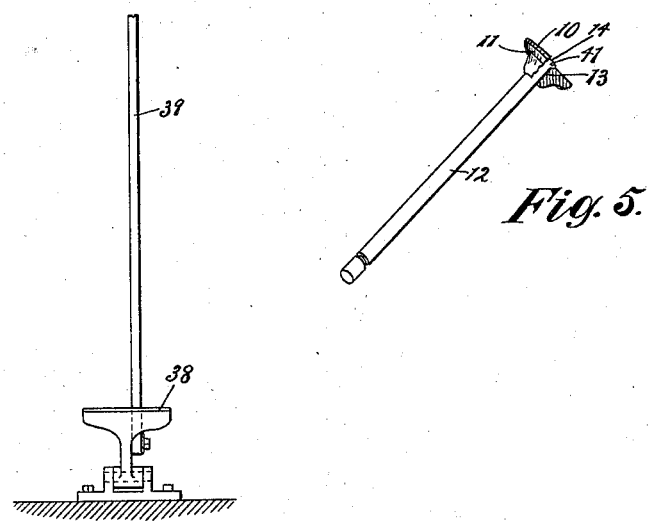

Patented Feb. 10, 1925.

1,525,547

UNITED STATES PATENT OFFICE.

ROBERT JARDINE, OF CHICAGO, ILLINOIS, ASSIGNOR TO RICH TOOL COMPANY, OF CHICAGO, ILLINOIS, A CORPORATION OF ILLINOIS.

MOTOR VALVE AND METHOD FOR MAKING THE SAME.

Original application filed December 20, 1920, Serial No. 431,956. Divided and this application filed October 23, 1922. Serial No. 596,422.

*To all whom it may concern:*

Be it known that I, ROBERT JARDINE, a citizen of the United States of America, and resident of Chicago, county of Cook, and State of Illinois, have invented certain new and useful Improvements in Motor Valves and Methods for Making the Same, of which the following is a specification, and which are illustrated in the accompanying drawings, forming a part thereof.

The invention relates to valves for internal combustion engines and has for its object the improvement of the valves and the provision of a method for producing the same. While the desirability of using different materials for the heads and stems of motor valves has been recognized, it is believed that this has not been satisfactorily accomplished except in valves of expensive construction. Furthermore, the formation of valves in two or more connected parts is objectionable and the cost of machining some of the materials having the characteristics which render them especially useful for the construction of the valve heads is frequently excessive.

The present invention accordingly contemplates a valve having its head cast from the selected material while the stem of the valve may be composed of other material, the latter being employed in the form of a rod or bar conforming to the dimensions of the stem and the said two parts being produced as one piece by casting the valve head upon the stem when the end of the stem to which the head is applied has been heated to insure a perfect bond between the two materials.

In the accompanying drawings:

Fig. 1 is a central vertical sectional view of one form of the apparatus, some parts being shown in elevation;

Fig. 2 is a plan view of the apparatus illustrated in Fig. 1 with some parts omitted and with the furnace walls shown in section;

Figs. 3 and 4 are sectional views, the planes of section being respectively indicated by the line 3—3 on Fig. 1 and the lines 4—4 on Fig. 2; and Fig. 5 is a perspective view of the valve, partly in section.

The head, as 10, of the valve (Fig. 5) is desirably composed of suitable metal for casting to substantially finished dimensions whereby machining or grinding is required only for smoothing the seat, as 11, removing such gates or fins (not shown) as would interfere with satisfactory operation of the valve in use and, in some cases, cutting the slot 41 commonly provided for receiving the tool employed for rotating the valve in seating the same. Either cast iron or such an alloy as is now used for casting high speed metal cutting tools may be employed for the head of the valve.

Formation of the valve head without forging the same and without machine operations other than those mentioned is obviously very important in reducing the cost of manufacture. Similarly, the employment of a fabricated rod of inexpensive carbon steel for the stem 12 also assists in maintaining a low cost of production for the finished article although a similar rod of one of the well known nickel alloys having a low and, in some cases, almost a negligible coefficient of expansion, may be employed for the valve stem if desirable. Furthermore, there is no objection to the use of different materials for the head 10 and stem 12 if a satisfactory bond 13 is obtained at the place where the head is applied to the stem. For this purpose the end 14 of the stem to which the head is applied is heated to a high temperature, preferably approaching an incandescent condition, and the head 10 is then cast upon the stem while in the said heated state. A permanent union of the two materials employed for the head and stem is thus obtained and the objection to a two-piece construction is wholly avoided. The addition of some coating or flux to facilitate the intimate joining of the head and stem is frequently advisable as will be fully understood by those skilled in the art.

Apparatus for producing motor valves embodying the invention preferably includes some form of heating appliance directly associated with the molds in which the valve heads are to be cast. In the particular form of apparatus illustrated in Figs. 1 to 4 of the drawings, a gas furnace generally designated 15 is provided for heating the ends 14 of the valve stems 12 upon which the valve heads 10 are to be cast, but other forms of furnaces may be used if desired. As shown, a mold block 16 of compressed carbon, cast iron or other suitable material, is employed and this block is formed with impressions 17 at its upper end for the casting of a plurality of valve heads 10, at one time. A flange 18 applied to the upper end of the mold block 16 provides a pouring gate 19 at one side and an over-flow cup 20 at the other side, the top of the block 16 being grooved, as at 21, to connect all of the impressions 17 with the said pouring gate and over-flow cup.

The mold block 16 is further bored, as at 22, in line with each mold impression 17, to receive the rods or bars 12 which constitute the valve stems. During the heating operation the valve stems 12 are usually to be supported in the elevated position illustrated in Fig. 3 wherein their upper ends 14 are exposed above the level of the top of the mold block 16, but this will not be necessary in all cases. In any event, when the valve heads, as 10, are to be cast, the valve stems 12 are preferably supported with their upper ends flush with the top of the mold blocks, 16, as in Fig. 1, and when the valve stems have been supported in the said elevated position for heating, depression of the valve stems before casting the heads, is required. To permit of this movement of the valve stems 12, the lower end of each valve stem may be seated upon a movable support, as the spring elevated plunger 23. As shown, the lower end of the mold block 16 is chambered, as at 24, to receive each of the plungers 23 and its spring 25, each chamber 24 being closed at its lower end by a screw plug 26, which constituted an abutment for the corresponding spring.

Since the furnace 15 is employed for heating the ends 14 of the valve stems 12, while the said valve stems are supported in the position illustrated in Fig. 3, the said furnace desirably takes the general form of a chambered cover for the top of the mold block 16. When so formed the side walls of the furnace may be provided with a plurality of openings 27 through each of which a gas burner, as 28, is directed. As lifting of the furnace is necessary to permit access to the mold, each gas burner 28 is preferably secured to the side walls of the furnace about the corresponding opening, as by brackets 29. One way in which depression of the valve stems 12 from the heating position illustrated in Fig. 3 to the pouring position illustrated in Fig. 1 may be accomplished is with a movable plate 30, which bears upon the upper ends of the valve stems and constitute the cope of the mold. As shown, the plate 30 is mounted within the chamber of the furnace 15 and is formed at one side with a flange 31, which, in the lower position of the plate, constitutes a part of the wall of the pouring gate 19.

The apparatus may be most conveniently used if provision is made for raising the furnace 15 and plate 30 together, but permitting them to be lowered separately. As shown, the furnace 15 is carried by a pair of hinge brackets 32 which are pivotally connected to a fixed support at 33. The plate 30 on the other hand is formed with a pair of uprights 34 which extend through the top of the furnace 15 and are there connected with an operating lever 35. In order that the operating lever 35 may serve for lifting both the plate 30 and the furnace 15 it is equipped with a hooked arm 36 for engagement with a pin 37 carried by the hinge brackets 32 of the furnace. When it is desired to lower the plate 30, the hook 36 is merely released from engagement with the pin 37.

Any desired arrangement may be employed for swinging the operating lever 35. That illustrated includes a foot pedal 38 and a link 39 extending from the foot pedal and connected to the lever 35 in front of the place, as 40, where the lever is to be fulcrumed. When this arrangement is employed the valve stems 12 are brought to the pouring position against the effort of the springs 25, by pressure on the foot pedal 38. Since the hook 36 will become engaged with the pin 37 when the plate 30 has been lowered, both the plate 30 and furnace 15 will be lifted when the pressure applied to the foot pedal 38 has been released. Under these circumstances, the molds are, of course, poured while the foot pedal 38 is being held in depressed position, and the mold block will remain relatively cool. On the other hand, the plate 30 becomes highly heated for it is located within the furnace at all times. It follows that while the underside of the valve head 10, comprising the seat portion 11, will be hardened by chilling of the molten metal upon contact with the relatively cool mold block 16, which chilling is desirable, the machining of the slot 41 in the upper surface of the valve head will not be interfered with for the reason that a heated member is used as the cope of the mold and chilling of the upper surface of the valve head is avoided.

The apparatus herein described is claimed in my copending application in apparatus for making motor valves, Serial No. 431,956 filed December 20, 1920, of which this application is a division.

I claim as my invention:

1. The method of producing motor valves having cast metal heads and wrought metal stems, which includes heating the end portion of the stem and the cope portion of the mold, assembling the cope portion with the drag portion of the mold, and supporting the heated portion of the stem in the impression space within the mold and casting the valve head on the heated end of the stem.

2. The method of producing motor valves having cast metal heads and wrought metal stems which includes supporting the cope portion of the mold and a portion of the stem above the drag portion of the mold, heating the cope portion of the mold and the end of the stem, lowering the cope on the drag and the heated end of the stem into the impressioned space of the mold and casting the head on the heated end of the stem.

3. The method of producing motor valves having cast metal heads and wrought metal stems which includes heating one end of the valve stem to a high temperature, inserting it into a mold having a relatively cool drag portion with an impression therein for the under portion of the valve head, and casting the head on the heated portion of the stem.

ROBERT JARDINE.